(12) United States Patent
Cui et al.

(10) Patent No.: US 9,129,058 B2
(45) Date of Patent: Sep. 8, 2015

(54) APPLICATION MONITORING THROUGH CONTINUOUS RECORD AND REPLAY

(71) Applicant: Microsoft Corporation, Redmond, WA (US)

(72) Inventors: Weidong Cui, Redmond, WA (US); Brendan Dolan-Gavitt, Somerville, MA (US); David Molnar, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 265 days.

(21) Appl. No.: 13/769,845

(22) Filed: Feb. 19, 2013

(65) Prior Publication Data

US 2014/0237293 A1    Aug. 21, 2014

(51) Int. Cl.
G06F 11/00    (2006.01)
G06F 11/34    (2006.01)

(52) U.S. Cl.
CPC .................................. G06F 11/3466 (2013.01)

(58) Field of Classification Search
CPC .................................................. G06F 11/3636
See application file for complete search history.

(56) References Cited

U.S. PATENT DOCUMENTS

| | | | |
|---|---|---|---|
| 8,132,190 B2 | 3/2012 | Vertes | |
| 8,407,321 B2* | 3/2013 | Mickens et al. | 709/220 |
| 2009/0328044 A1 | 12/2009 | Bergheaud et al. | |
| 2010/0005464 A1 | 1/2010 | Malyugin et al. | |
| 2010/0251031 A1 | 9/2010 | Nieh et al. | |
| 2011/0078666 A1 | 3/2011 | Altekar | |
| 2012/0239987 A1* | 9/2012 | Chow et al. | 714/49 |
| 2013/0160128 A1* | 6/2013 | Dolan-Gavitt et al. | 726/25 |

OTHER PUBLICATIONS

Bond, Michael D., "Tracking Conflicting Accesses Efficiently for Software Record and Replay", Retrieved at <<http://www.cse.ohio-state.edu/~mikebond/roctet-tr.pdf>>, Technical Report, Ohio State University, Feb. 22, 2012, pp. 11.

Narayanasamy, et al., "BugNet: Continuously Recording Program Execution for Deterministic Replay Debugging", ACM SIGARCH Computer Architecture News. vol. 33. No. 2. IEEE Computer Society, Jun. 2005, pp. 12.

Zamfir, et al., "Execution Synthesis a Technique for Automated Software Debugging", Retrieved at <<http://llvm.org/pubs/2010-04-EUROSYS-ExecutionSynthesis.pdf>>, 5th European conference on computer systems, Apr. 13, 2010, pp. 14.

"Application Monitoring Through Collective Record and Replay", U.S. Appl. No. 13/325,062, filed Dec. 14, 2011, pp. 26.

(Continued)

*Primary Examiner* — Christopher McCarthy
(74) *Attorney, Agent, or Firm* — Julie Kane Akhter; Stein Dolan; Micky Minhas (57) ABSTRACT

A method, system, and computer-readable storage medium for application monitoring through continuous record and replay are described herein. The method includes continuously recording execution traces including external non-deterministic input data for an application at a user device and analyzing the recorded execution traces to identify relevant execution traces for determining a behavior of the application. The method also includes reporting the relevant execution traces to a server, wherein the server is configured to replay the relevant execution traces to determine whether the behavior of the application is as expected.

18 Claims, 5 Drawing Sheets

(56) References Cited

OTHER PUBLICATIONS

Agarwal, et al., "There's an App for That, But it Doesn't Work: Diagnosing Mobile Applications in the Wild", Retrieved at <<http://research.microsoft.com/pubs/136889/hotnets2010-mobibug.pdf>>, In Proceedings of Ninth ACM Workshop on Hot Topics in Networks, Oct. 20, 2010, pp. 6.

Altekar, et al., "ODR: Output-Deterministic Replay for Multicore Debugging", Retrieved at <<http://www.sigops.org/sosp/sosp09/papers/altekar-sosp09.pdf>>, In Proceedings of the ACM SIGOPS 22nd Symposium on Operating Systems Principles, Oct. 11, 2009, pp. 14.

Amini, et al., "Towards Scalable Evaluation of Mobile Applications through Crowdsourcing and Automation", Retrieved at <<http://www.cylab.cmu.edu/files/pdfs/tech_reports/CMUCyLab12006.pdf>>, In Technical reports, Feb. 29, 2012, pp. 12.

Attariyan, et al., "Automating Configuration Troubleshooting with Dynamic Information Flow Analysis", Retrieved at <<http://static.usenix.org/events/osdi10/tech/full_papers/Attariyan.pdf>>, In Proceedings of the 9th USENIX Conference on Operating Systems Design and Implementation, Oct. 4, 2010, pp. 14.

Ball, et al., "Lightweight Log-Based Code Coverage", Retrieved at <<http://research.microsoft.com/apps/pubs/default.aspx?id=163517>>, In Microsoft Technical Report MSR-TR-2012-48, May 2012, p. 1.

Bhansali, et al., "Framework for Instruction-level Tracing and Analysis of Program Executions", Retrieved at <<http://citeseerx.ist.psu.edu/viewdoc/download?doi=10.1.1.131.6300&rep=rep1&type=pdf>>, In Proceedings of the 2nd International Conference on Virtual Execution Environments, Jun. 14, 2006, pp. 10.

Bigham, et al., "VizWiz: Nearly Real-time Answers to Visual Questions", Retrieved at <<http://citeseerx.ist.psu.edu/viewdoc/download?doi=10.1.1.222.9697&rep=rep1&type=pdf>>, In Proceedings of the 23nd Annual ACM Symposium on User Interface Software and Technology, Oct. 3, 2010, pp. 10.

Candea, George., "Exterminating Bugs via Collective Information Recycling", Retrieved at <<http://ieeexplore.ieee.org/stamp/stamp.jsp?tp=&arnumber=5958813>>, In IEEE/IFIP 41st International Conference on Dependable Systems and Networks Workshops (DSN-W), Jun. 27, 2011, pp. 5.

Dunlap, et al., "ReVirt: Enabling Intrusion Analysis through Virtual-Machine Logging and Replay", Retrieved at <<http://web.eecs.umich.edu/virtual/papers/dunlap02.pdf>>, In Proceedings of the 5th Symposium on Operating Systems Design and Implementation, Dec. 9, 2002, pp. 14.

Glerum, et al., "Debugging in the (Very) Large: Ten Years of Implementation and Experience", Retrieved at <<http://citeseerx.ist.psu.edu/viewdoc/download?doi=10.1.1.148.716&rep=rep1&type=pdf>>, In Proceedings of the ACM SIGOPS 22nd Symposium on Operating Systems Principles, Oct. 11, 2009, pp. 17.

Godefroid, et al., "Automated Whitebox Fuzz Testing", Retrieved at <<http://research.microsoft.com/en-us/projects/atg/ndss2008.pdf>>, In Proceedings of Network and Distributed Systems Security, Feb. 10, 2008, pp. 16.

Guo, et al., "R2: An Application-Level Kernel for Record and Replay", Retrieved at <<http://static.usenix.org/event/osdi08/tech/full_papers/guo/guo.pdf>>, In Proceedings of 8th USENIX Symposium on Operating Systems Design and Implementation, Dec. 8, 2008, pp. 16.

Hunt, et al., "Detours: Binary Interception of Win32 Functions", Retrieved at <<http://research.microsoft.com/pubs/68568/huntusenixnt99.pdf>>, In Proceedings of the 3rd USENIX Windows NT Symposium, Jul. 12, 1999, pp. 9.

Kamar, et al., "Combining Human and Machine Intelligence in Large-scale Crowdsourcing", Retrieved at <<http://research.microsoft.com/en-us/um/people/eckamar/papers/GalaxyZoo-AAMAS2012.pdf>>, In Proceedings of the 11th International Conference on Autonomous Agents and Multiagent Systems, Jun. 4, 2012, pp. 8.

King, et al., "Debugging Operating Systems with Time-Traveling Virtual Machines", In Proceedings of USENIX Annual Technical Conference, Apr. 10, 2005, pp. 15.

Liblit, et al., "Bug Isolation via Remote Program Sampling", Retrieved at <<http://www.cs.umd.edu/class/spring2004/cmsc838p/Remote/bug-isolation.pdf>>, In Proceedings of the ACM SIGPLAN Conference on Programming Language Design and Implementation, Jun. 9, 2003, pp. 14.

"Microsoft Application Virtualization (App-V)", Retrieved at <<http://www.microsoft.com/en-us/windows/enterprise/products-and-technologies/virtualization/app-v.aspx>>, Retrieved Date: Oct. 31, 2012, p. 1.

Park, et al., "PRES: Probabilistic Replay with Execution Sketching on Multiprocessors", Retrieved at <<http://www1.cs.columbia.edu/~junfeng/reliable-software/papers/pres.pdf>>, In Proceedings of the ACM SIGOPS 22nd Symposium on Operating Systems Principles, Oct. 11, 2009, pp. 15.

"Enhanced Execution Record / Replay in Workstation 65", Retrieved at <<http://blogs.vmware.com/workstation/2008/04/enhanced-execut.html>>, N/A, Apr. 10, 2008, pp. 3.

Wu, et al., "Language-Based Replay via Data Flow Cut", Retrieved at <<http://ns1.fs.net/~xi/papers/itarget-fse10.pdf>>, In Proceedings of the Eighteenth ACM SIGSOFT International Symposium on Foundations of Software Engineering, Nov. 7, 2010, pp. 10.

Xu, et al., "A "Flight Data Recorder" for Enabling Full-system Multiprocessor Deterministic Replay", Retrieved at <<http://ieeexplore.ieee.org/stamp/stamp.jsp?tp=&arnumber=1206994>>, In Proceedings of the 30th Annual International Symposium on Computer Architecture, Jun. 9, 2003, pp. 12.

Yu, et al., "A Feather-weight Virtual Machine for Windows Applications", Retrieved at <<http://static.usenix.org/events/vee06/full_papers/p24-yu.pdf>>, In Proceedings of the 2nd International Conference on Virtual Execution Environments, Jun. 14, 2006, pp. 11.

Zelkowitz, M.V., "Reversible Execution", Retrieved at <<http://www.cs.umd.edu/users/mvz/pub/zelkowitz-cacm-1973.pdf>>, In Communications of the ACM, vol. 16, Issue 9, Sep. 1973, pp. 1.

* cited by examiner

APPLICATION MONITORING THROUGH CONTINUOUS RECORD AND REPLAY

BACKGROUND

Many multi-user operating systems associate privileges with user accounts. When a user installs an application, the application runs in the name of the user and inherits the user's ability to access the system resources. However, modern browsers and device operating systems, such as smartphone operating systems, often treat applications as mutually-untrusting, potentially-malicious principals. In most cases, applications are isolated except for explicit inter-process, or inter-application, communication (IPC) channels. In addition, applications can be unprivileged by default, requiring user permission for additional privileges. In other words, permission to use devices and access user-private data through system application programming interfaces (APIs) may be granted to individual applications by the user.

However, modern permission systems may be undermined by the presence of malicious software within applications. Such malicious software may compromise users' privacy or violate platform providers' security policies. Current approaches focus on preventing malicious applications from reaching end users through manual review of each application that is added to the marketplace. However, this process is costly and time-consuming. Moreover, although approaches exist for monitoring applications in the wild, such as event logging and crash reports or online taint flow analysis, these methods are limited by either the small quantity of data collected or the high performance overhead on the end user.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for application monitoring through continuous record and replay. The method includes continuously recording execution traces including external non-deterministic input data for an application at a user device, and analyzing the recorded execution traces to identify relevant execution traces for determining a behavior of the application. The method also includes reporting the relevant execution traces to a server, wherein the server is configured to replay the relevant execution traces to determine whether the behavior of the application is as expected.

Another embodiment provides a system for application monitoring. The system includes a user device including an application configured to send execution traces including external non-deterministic input data to an application programming interface (API). The user device also includes a recording module configured to intercept the execution traces being sent to the API and continuously record the execution traces. The user device also includes a reporting module configured to analyze the recorded execution traces to identify relevant execution traces for determining a behavior of the application and report the relevant execution traces to a server. The system also includes the server including a replay module. The replay module is configured to store the relevant execution traces and replay the relevant execution traces to determine whether the behavior of the application is as expected.

In addition, another embodiment provides a computer-readable storage medium for storing computer-readable instructions. The computer-readable instructions provide the application monitoring system when executed by a processing device. The computer-readable instructions include code configured to continuously record execution traces including external non-deterministic input data for an application and analyze the recorded execution traces to identify relevant execution traces for analyzing a manner in which the application is behaving. The computer-readable instructions also include code configured to report the relevant execution traces to a server, wherein the server is configured to replay the relevant execution traces to determine whether the application is behaving in an authorized manner.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

According to current technologies, testing the software for applications, or programs, before releasing the applications does not provide for the identification of all the software "bugs," i.e., errors, in the applications. Continuous monitoring of applications after installation is desirable for uncovering issues that were not found in pre-release testing. Current techniques for monitoring deployed applications involve either checking logging and profiling events in a running application or collecting a memory snapshot after the application crashes. However, such techniques result in the collection of only limited information regarding the application, thus restricting the effectiveness of postmortem analysis. For example, crash dumps provide limited value when bugs depend on specific configuration options or details of the user's environment, and logged events can only capture exceptional conditions envisioned by the developers before release of the application.

Record and replay is a classic technique for storing and repeating a program's executions. Several current record and replay systems directly save all executed instructions. Such systems can support all kinds of applications without customization, but have high performance overheads and large log sizes. Library-based systems record the results of a set of functions and return the results instead of executing the functions during replay. While library-based systems have more acceptable performance overheads and log sizes, such systems cannot support a wide range of applications without customization because they depend on deep knowledge of thousands of function application programming interfaces (APIs) as well as some internal application semantics. Finally, virtual machine-based record and replay systems can support a wide range of applications with reasonable performance overhead. However, replay for virtual machine-based record and replay systems depends on the ability to access the virtual machine image, rendering such systems unsuitable for reproducing users' executions remotely.

Embodiments described herein set forth a method and system for application monitoring through implementation of a continuous record and replay procedure. The continuous record and replay procedure described herein allows for lightweight recording of sufficient client application information to reproduce full executions at a central server. Unlike library-based solutions that attempt to understand and intercept thousands of internal APIs, the continuous record and replay procedure treats an application as a virtual machine and focuses on the non-deterministic external inputs that commonly drive an application's execution. While this technique may result in a less faithful replay than other techniques, it is sufficient to reproduce a wide class of application errors at a modest cost.

The applications that are utilized according to embodiments described herein may include, for example, smartphone applications implemented on a mobile phone or Web applications implemented on a Web site, among others. Moreover, the applications may also include any types of computer programs which execute code that is related to any form of non-deterministic data. Such a method and system may prevent applications from performing actions that are not desired by the user, particularly in relation to non-deterministic data.

As used herein, the term "non-deterministic data" refers to any data that is variable or inconstant, such as data that is typed into the user device directly by the user, multiple-choice data, or any type of user-private data. For example, non-deterministic data may include a name, a day of the week, a day of the month, a gender, an age, a phone number, an email address, a contact list, a message inbox, a message outbox, a global positioning system (GPS) location, a birthday, or a credit card number, among others. According to embodiments described herein, external non-deterministic input data is used for the continuous record and replay procedure. Such external non-deterministic input data may include, for example, file data, network data, graphical user interface (GUI) data, registry data, or system information.

To implement the continuous record and replay procedure, a number of execution traces for a particular application running on a user device may be recorded. As used herein, an "execution trace" is a sequence of API calls and non-deterministic data related to the API calls made by an application. Moreover, in some embodiments, execution traces may be recorded for a number of different applications running on any number of user devices.

In various embodiments, the data recorded may include both the parameters passed to the API and the data returned from the API. Once the execution traces have been recorded, they may be aggregated, replayed, and analyzed in order to determine whether the particular application is likely to be using the non-deterministic data for malicious purposes. Moreover, if it is determined that the application is likely to be malicious, the application may be blocked from the marketplace or removed from the user devices, or both.

Figure 1:
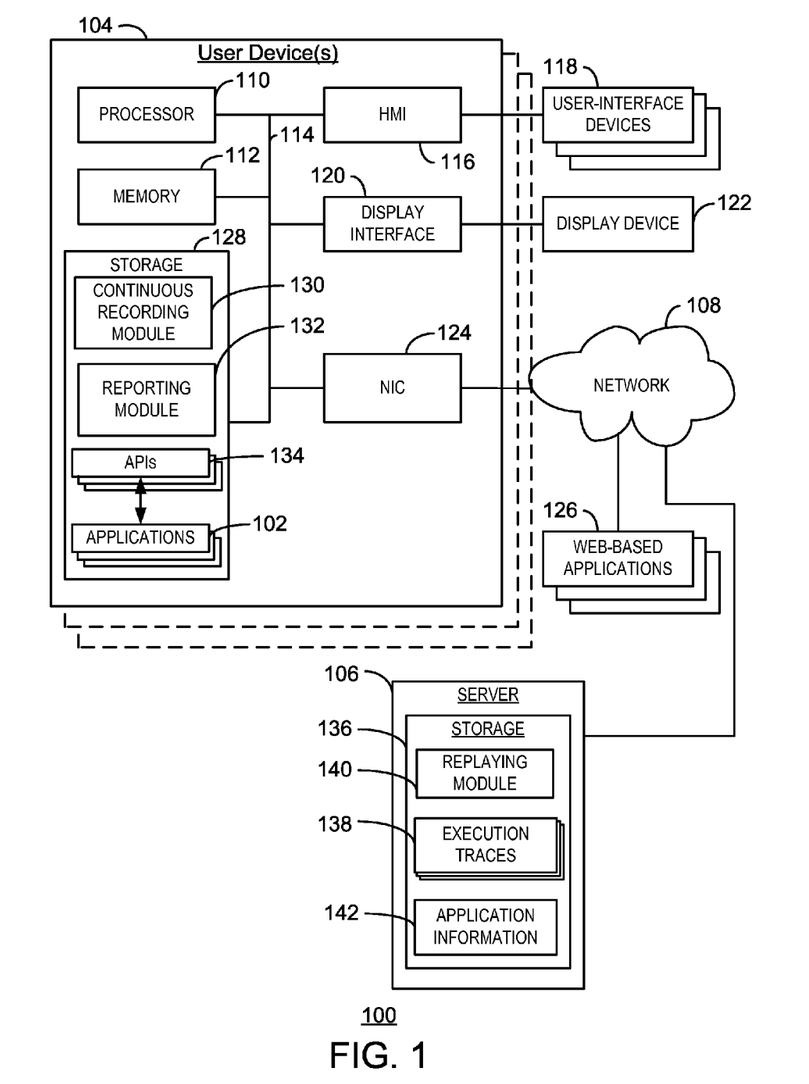
FIG. 1 is a block diagram of an application monitoring system that may monitor applications running on a user device through the implementation of a continuous record and replay procedure.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As used herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device, or media.

As used herein, terms "component," "search engine," "browser," "server," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an application monitoring system 100 that may monitor applications 102 running on a user device 104 through the implementation of a continuous record and replay procedure. The application monitoring system 100 may include the user device 104 and a server 106 that is communicably coupled to the user device 104 via a network 108. Further, in some embodiments, the application monitoring system 100 includes a number of user devices 104, and the server 106 may be a centralized server to which each user device 104 is communicably coupled via the network 108.

The user device 104 may be any suitable type of computing device, such as, for example, a mobile phone, a tablet, a desktop computer, a laptop computer, an electronic reader, a television, or a media player, or any combinations thereof. Moreover, the user device 104 may be implemented within a server, wherein the server may include, for example, a Web server or a cloud server. Furthermore, the user device 104 may be any computing system that utilizes any suitable type of application or program. For example, the user device 104 may be a system in a car or a home that is configured to perform any of a variety of different functions in response to execution traces generated through applications or programs.

The user device 104 may include a processor 110 that is adapted to execute stored instructions, as well as a memory device 112 that stores instructions that are executable by the processor 110. The processor 110 may be a single core processor, a multi-core processor, a computing cluster, or any number of other configurations. The memory device 112 can include random access memory (RAM), read only memory (ROM), flash memory, or any other suitable memory systems. The stored instructions executed by the processor 110 may implement a method for monitoring the applications 102 running on the user device 104 using execution traces for the applications 102 according to a continuous record and replay procedure. The processor 110 may be connected through a bus 114 to any number of input and output devices.

The user device 104 may include a human-machine interface (HMI) 116. The HMI 116 may connect the user device 104 to any number of user-interface devices 118, such as a touchscreen, a speaker, or a pointing device, among others. The user device 104 may be linked through the bus 114 to a display interface 120 adapted to connect the user device 104 to a display device 122. The display device 122 may include a computer monitor or a display screen of a mobile device, among others.

A network interface controller (NIC) 124 may be included to connect the user device 104 through the bus 114 to the network 108. Through the network 108, Web-based applications 126 may be downloaded to the user device 104 and stored within a storage device 128 of the user device 104. Alternatively, the user device 104 may access the Web-based applications 126 through a Web browser. Furthermore, the user device 104 may be communicably coupled to any number of other user devices through the network 108.

The storage device 128 of the user device 104 may include a hard drive, an optical drive, a thumbdrive, an array of drives, or any combinations thereof. The storage device 128 may be adapted to store a continuous recording module 130 and a reporting module 132. The continuous recording module 130 may log execution traces including external non-deterministic input data for any of the applications 102. The reporting module 132 may analyze the recorded execution traces for each application 102 to identify execution traces that may be useful for determining whether each application 102 is behaving in an authorized manner. For example, the reporting module 132 may determine that the execution traces within a recorded log are useful if only new code is included within the log, or if the application 102 crashed during or shortly after generation of the execution traces. The reporting module 132 may then send the identified execution traces for each application 102 to the server 106 via the network 108, as discussed further below.

Furthermore, the storage device 128 may be adapted to store any number of application programming interfaces (APIs) 134 for executing the applications 102 on the user device 104. In various embodiments, APIs 134 corresponding to external non-deterministic input data may be used for the continuous record and replay procedure described herein. For example, APIs 134 relating to file data, network data, GUI data, registry data, or system information corresponding to the user device 104 may be used for the continuous record and replay procedure.

In various embodiments, the server 106 includes a storage device 136. The storage device 136 of the server 106 may include a hard drive, an optical drive, a thumbdrive, an array of drives, or any combinations thereof. The storage device 136 may be adapted to store execution traces 138 received from the reporting module 132 of the user device 104.

In addition, the storage device 136 may include a replaying module 140. The replaying module 140 may replay the received execution traces 138 for each application 102 to determine whether each application 102 is behaving in an authorized manner. In some embodiments, the replaying module 140 stores application information 142 corresponding to the behavior of each application 102 and possible modifications that may improve the behavior of each application 102 in the storage device 136. Furthermore, the replaying module 140 may determine modifications to any of the applications 102 based on the behavior of each application 102. The server 106 may then send information relating to the modifications to any of the applications 102 to the user device 104 via the network 108, and the applications 102 may be updated on the user device 104 accordingly.

The block diagram of FIG. 1 is not intended to indicate that the application monitoring system 100 is to include all of the components shown in FIG. 1. Furthermore, the application monitoring system 100 may include any number of additional components not shown in FIG. 1, depending on the details of the specific implementation.

Figure 2:
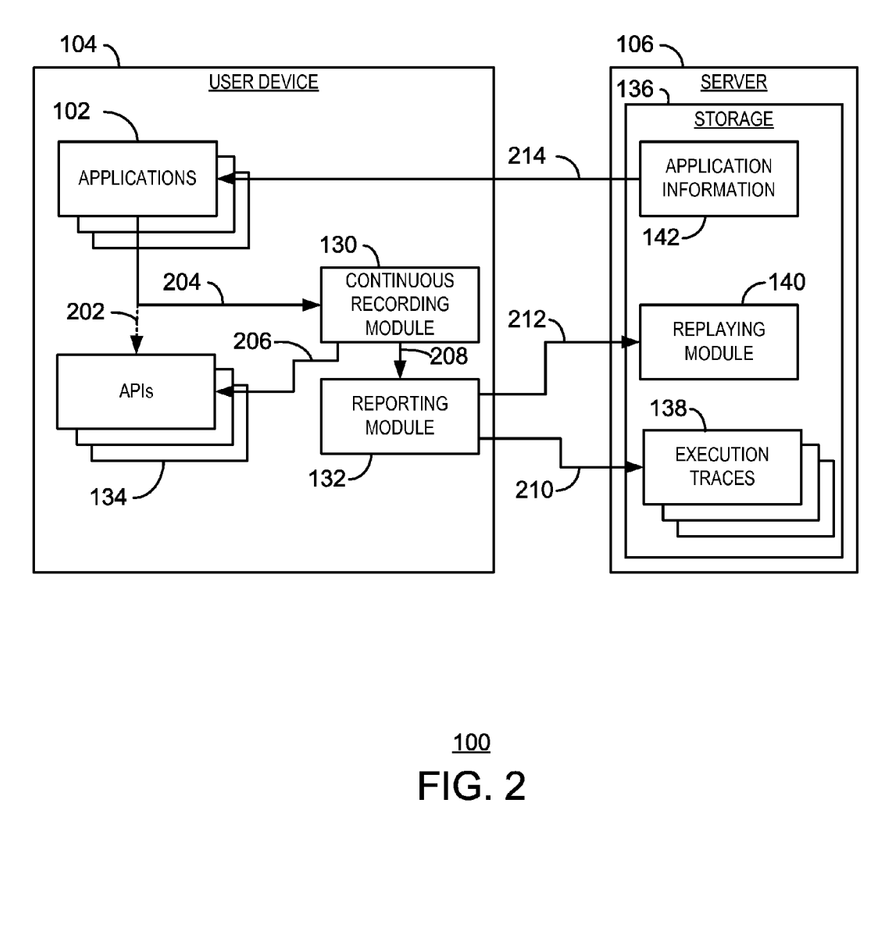
FIG. 2 is a process flow diagram illustrating the implementation of the continuous record and replay procedure using the application monitoring system.

FIG. 2 is a process flow diagram illustrating the implementation of the continuous record and replay procedure using the application monitoring system 100. In various embodiments, one of the applications 102 running on the user device 104 sends API calls including execution traces to one of the APIs 134, as indicated by arrow 202. However, API calls including execution traces relating to external non-deterministic input data may be intercepted by the continuous recording module 130, as indicated by arrow 204. The continuous recording module 130 may record the execution traces relating to the external non-deterministic input data.

The recording procedure executed by the continuous recording module 130 may vary depending on the type of external non-deterministic input data that is being recorded. For example, external non-deterministic input data relating to file data, network data, GUI data, registry data, and system information may be recorded by the continuous recording module 130 according to different recording procedures, as discussed further below.

In various embodiments, the continuous recording module 130 is configured to record execution traces relating to file data. In such embodiments, copies of all files opened by the application 102 may be made and included within the log. By making a copy at the beginning and then allowing the remaining file operations to go unintercepted, very little to no overhead for individual reads and writes performed on the file may be incurred.

To copy files, the APIs 134 for file creation and opening may be intercepted. At recording time, the name of the file being read or created may be noted. If the file exists on disk, the entire file may be copied into the log. Then, a unique identifier may be generated for the file, and the mapping between the original file name and the saved copy may be saved. If the file does not exist or the file creation fails for some other reason, the failure is logged so that the error code can be reproduced during replay. To replay, the file name may be modified during the file create/open call to redirect the access to the copy stored in the recorded log. If the same call failed during recording, the stored error code may be returned without any redirection.

In some embodiments, files opened in read-only mode are not saved immediately. Instead, the locations of the files may be noted, and the copying of the files may be deferred until after the program has exited. For example, a video player that opens a file as read-only will not cause a copy to happen until the player exits. If the file is subsequently opened for writing, or if an attempt is made to delete it, the file may be copied immediately.

The log size may also be reduced by declining to copy well-known files during the deferred copy. Many files opened by a program, such as fonts, system libraries, and so on, are available from other sources. A hash of a file may be checked once opened to ensure it is the same well-known file present on the replay server. If the hashes match, the file may not be included in the log. During replay, these files may be directly obtained from the replay system.

In various embodiments, the continuous recording module 130 is configured to record execution traces relating to network data. Network record and replay for client applications may be challenging. Because no attempt to faithfully reproduce the ordering of threads during replay is made, it is not possible to rely on ordering to determine which recorded data are associated with each connection. This problem may be especially challenging for asynchronous, multithreaded applications that can open multiple connections to the same server and send multiple requests on each connection with an ordering that may change on each run.

For network applications, such as web browsers, communication typically follows a pattern of requests by the client and responses from the server occurring in pairs. When an application issues a request, the request is saved and specific information, e.g., a protocol, about the request is extracted. For example, in the case of HTTP, the requested URI may be extracted. During replay, this information may be used to identify the appropriate response for a client request, even if the request occurs in a different order or on a different connection. For each pair of request and response events, the IP and port information may also be saved.

To replay the recorded traffic, a listening server may be created inside the application's process on the replay machine, and all connections made by the application may be redirected to this server.

Aside from redirection, an additional step may also be taken when replaying network traffic. After the connection is made, the server may be informed of the intended IP and port for the connection using in-band signaling. In other words, the IP and port may be sent to the server on the same connection that will be used to transfer the content. Doing this notification in-band allows for the avoidance of any synchronization issues when informing the server of the intended destination of the connection. The server then waits for requests from the application, extracts protocol-specific information, and uses the protocol-specific information in conjunction with the IP and port to identify the appropriate response. Using these strategies, large, multithreaded network applications may be replayed.

Network record and replay for server applications is generally more straightforward than for client applications. Since the sending of requests is controlled during replay, it may be ensured that the requests sent on the same connection during recording are sent on the same connection and in the same order during replay.

Similar to replaying client applications, a thread may be created inside the application's process on the replay machine. The thread may then be used to initiate connections to the server, send requests, and receive responses. This can also be done from different processes on the same or different machines in some cases.

When replaying server applications, the time at which the client connections are to be initiated during replay may be determined. This may be accomplished by logging the time elapsed since the recording started when a new connection is accepted by the server application. During replay, the connection is started only after the same amount of time has passed.

The continuous recording module 130 may also be configured to record execution traces relating to GUI data. The approach to GUI data recording is similar to the approach for network data recording. During recording, keyboard presses are intercepted, as well as mouse movements and clicks. During replay, a new thread is spawned within the application to send the recorded GUI events to the application.

As discussed above, during network replay, a response is sent after receiving a request. The difference in replaying GUI events is that there are no requests to trigger responses. The requests are changes in the visual state of the application that prompt users to respond with key strokes and mouse clicks. To solve this problem, the timing of GUI events may be recorded. Then, during replay, the GUI events may be sent at the appropriate time.

In various embodiments, the continuous recording module 130 is also configured to record execution traces relating to registry data. The registry for an operating system may be a central key-value store for configuration information. Because these configuration values can and usually do directly affect the behavior of applications, queries to the registry may be recorded and replayed.

As with file and network data recording, for registry data recording, copies of the objects accessed by the program may be made during recording, and calls to these saved objects may be redirected during replay. Also, as with file data recording, keys that were only read by the application are not copied until after the application has exited.

Furthermore, the continuous recording module 130 may be configured to record execution traces relating to system information. System information is often used by applications to drive their executions. For instance, an application may decide whether a cached file is stale based on the current system time. To improve the fidelity of the replay procedure, system information retrieved by the application may be recorded.

APIs for retrieving system information often have no input parameters that can be used to match a call at replay to a call at recording. In addition, the order of API calls cannot simply be followed since threads may follow a different order between record and replay. In some embodiments, two techniques may be used to solve this problem, including call stack matching and thread matching. When intercepting a call to an API that retrieves some system information, the call stack up may be recorded to a given number of frames, as well as the value returned. During replay, for an intercepted call to the same API, the recorded value is returned from the call of the same call stack. Note that every recorded value may be used only once and in the same order as recorded. In addition to call stack matching, thread matching may also be performed. A call intercepted on a thread during replay may only be matched with a call intercepted on the same thread during recording. Since thread pools are often used in large applications, the launching order of threads cannot simply be used to label them. Instead, the start address may be used to label a thread. For threads with the same start address, their calls may be grouped to system information APIs together.

In some embodiments, if random numbers differ between record and replay, the application behavior may differ. During file replay, a file name that contains a random number (e.g., GUID) may not match any recorded file names. Similarly, a network request generated during replay may not match any recorded network request. For example, some sites use random values in URLs related to advertising providers.

Other random number generation systems may use information that is not usually used to drive an application execution, such as the value of a returned file handle. Furthermore, imperfect replay fidelity will inevitably introduce noise and cause minor deviations in the execution during replay. This may affect random number generation as well.

To mitigate the effects of divergent random number generation, a fuzzy matching scheme may be employed. For a file or network request in replay, if the exact matched file name or network request cannot be found, the edit distance between the replayed name and the recorded names may be computed, and the one with the minimum edit distance may be chosen. Moreover, during replay, fidelity problems may be further mitigated by replaying a recorded trace multiple times. This may allow the system to explore different thread interleavings, making it more likely that non-deterministic information will be faithfully reproduced.

In various embodiments, once the continuous recording module 130 has recorded the execution traces relating to external non-deterministic input data, the continuous recording module 130 may redirect the intercepted API calls back to the APIs 134, as indicated by arrow 206. The APIs 134 may then execute the API calls normally.

In addition, the continuous recording module 130 may send the recorded execution traces to the reporting module 132, as indicated by arrow 208. The reporting module 132 may analyze each execution trace to determine whether the execution trace is relevant to determining the behavior of the application 102.

In some embodiments, in order to determine which execution traces are relevant, the reporting module 132 may measure the block coverage of each run and check if the recording executed any code not seen by other users. If the recording executed code not see by other uses, the corresponding execution traces may be determined to be relevant to determining the behavior of the application 102.

Once the reporting module 132 has determined the relevant execution traces 138, the reporting module 132 may send the relevant execution traces to the server 106, as indicated by arrow 210. The server 106 may store the execution traces 138 within the storage device 136. Furthermore, the reporting module 132 may send the execution traces to the replaying module 140 within the storage device 136 of the server 106.

The replaying module 140 may replay the relevant execution traces to determine whether the behavior of the application 102 is as expected. If the behavior of the application 102 is not as expected, the application 102 may be considered to be a malicious application that is behaving in an unauthorized manner. According to such embodiments, modifications to the application 102 that may cause the application 102 to behave as expected may be identified. The identified modifications may be saved in the storage device 136 of the server 106 as the application information 142. In addition, the application information 142 may include information relating to the current behavior of the application 102.

In some embodiments, the application information 142 may be sent to the application 102 running on the user device 104, as indicated by arrow 214. The application information 142 may be used to modify the application 102 to correct software bugs, or may be used to inform the user of the user device 104 of possible issues with the application 102.

The process flow diagram of FIG. 2 is not intended to indicate that the continuous record and replay procedure is to be implemented in the exact manner shown in FIG. 2. Rather, the implementation of the continuous record and replay procedure shown in FIG. 2 may be altered in a variety of different ways depending on the details of the specific implementation.

Figure 3:
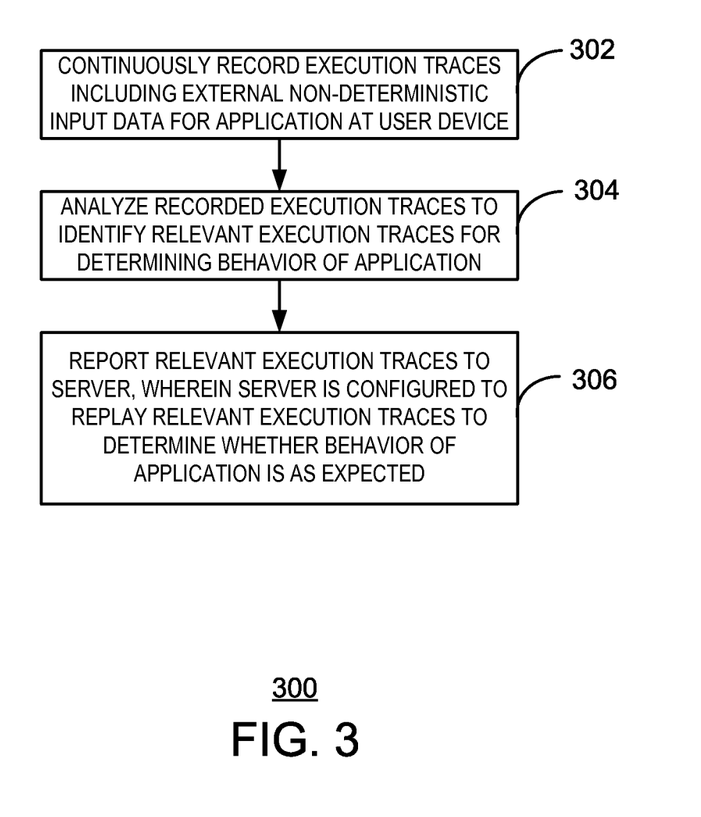
FIG. 3 is a process flow diagram of a method for application monitoring through continuous record and replay.

FIG. 3 is a process flow diagram of a method 300 for application monitoring through continuous record and replay. The method 300 may be executed by any suitable type of computing device, such as the user device 104 within the application monitoring system 100 discussed with respect to FIG. 1. Moreover, the method 300 may be used to monitor the behavior or functioning of any type of application or program that utilizes external non-deterministic input data.

The method begins at block 302, at which execution traces including external non-deterministic input data for an application are continuously recorded at a user device. In various embodiments, recording the execution traces includes redirecting an API call including the execution traces from an API to a recording module of the user device, wherein the recording module is configured to log the execution traces relating to the API call and return the API call to the application to enable a normal execution of the API call.

At block 304, the recorded execution traces are analyzed to identify relevant execution traces for determining a behavior of the application. In some embodiments, this is accomplished by determining whether the application crashed during or after the recording of specific execution traces and, if the application crashed during or after recording, identifying the specific execution traces as relevant execution traces. In other embodiments, this is accomplished by comparing the recorded execution traces to execution traces stored on the server and identifying only the recorded execution traces that are not already stored on the server as the relevant execution traces.

At block 306, the relevant execution traces are reported to a server, wherein the server is configured to replay the relevant execution traces to determine whether the behavior of the application is as expected. The server may be configured to replay the relevant execution traces by executing an API call using the relevant execution traces and utilizing a result of the API call to analyze the behavior of the application.

The application may be considered to be behaving as expected if the application is functioning in a manner that is authorized by a user or a service provider, or both. Alternatively, the application may be considered to not be behaving as expected if the application utilizes any non-deterministic data in an unauthorized manner or for an unexpected purpose, wherein the unexpected purpose may include any function that is not approved or authorized by a user or a service provider, or both. For example, an application that is behaving in an unexpected manner, e.g., a malicious application, may share non-deterministic data with an unapproved third party in an unauthorized manner. Furthermore, if the application is not behaving as expected, modifications to the application may be determined and implemented in order to correct software bugs within the application.

The process flow diagram of FIG. 3 is not intended to indicate that the blocks of the method 300 are to be executed in any particular order, or that all of the blocks are to be included in every case. Further, any number of additional blocks may be included within the method 300, depending on the details of the specific implementation. For example, in some embodiments, execution traces relating to external non-deterministic input data for a number of applications are continuously recorded at the user device. The recorded execution traces may be analyzed to identify relevant execution traces for determining a behavior each application, and the relevant execution traces may be reported to the server. The server may be configured to replay the relevant execution traces to determine whether the behavior of each application is as expected. Furthermore, in some embodiments, the server is configured to combine the relevant execution traces for the application received from the user device with relevant execution traces for the application received from a number of other user devices and replay the combined relevant execution traces to determine whether the application is behaving as expected.

Figure 4:
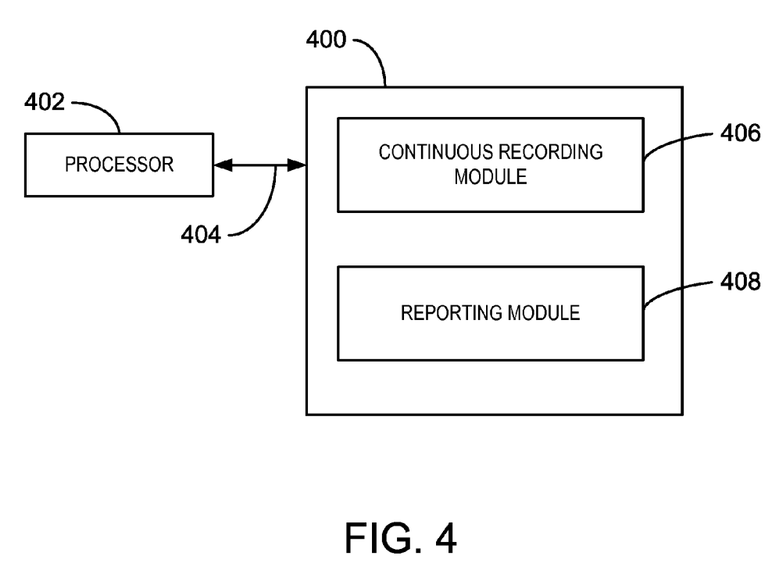
FIG. 4 is a block diagram showing a computer-readable storage medium that stores code adapted to perform the recording portion of the continuous record and replay procedure.

FIG. 4 is a block diagram showing a computer-readable storage medium 400 that stores code adapted to perform the recording portion of the continuous record and replay procedure. The computer-readable storage medium 400 may be accessed by a processor 402, for example, over a computer bus 404. Furthermore, the computer-readable storage medium 400 may include code configured to direct the processor 402 to perform the steps of the current method.

Some of the software components discussed herein may be stored on the computer-readable storage medium 400, as indicated in FIG. 4. For example, a continuous recording module 406 may be configured to record a number of execution traces including external non-deterministic input data for any number of applications from any number of user devices. In addition, a reporting module 408 may be configured to analyze the recorded execution traces to identify relevant execution traces for determining a behavior of each application. The reporting module 408 may also be configured to report the relevant execution traces to a replaying module on a separate computer-readable storage medium, as discussed with respect to FIG. 5. Furthermore, the computer-readable storage medium 400 may also include any number of additional software components not shown in FIG. 4.

Figure 5:
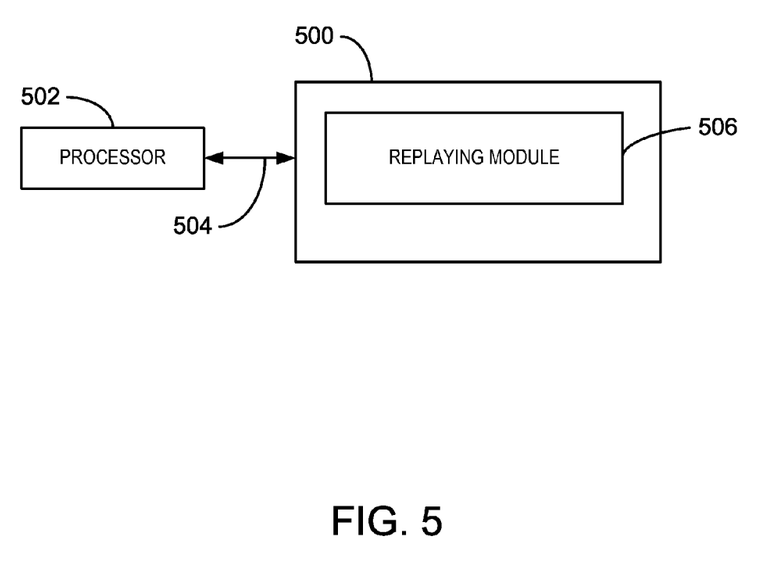
FIG. 5 is a block diagram showing a computer-readable storage medium that stores code adapted to perform the replaying portion of the continuous record and replay procedure.

FIG. 5 is a block diagram showing a computer-readable storage medium 500 that stores code adapted to perform the replaying portion of the continuous record and replay procedure. The computer-readable storage medium 500 may be accessed by a processor 502, for example, over a computer bus 504. Furthermore, the computer-readable storage medium 500 may include code configured to direct the processor 502 to perform the steps of the current method.

Some of the software components discussed herein may be stored on the computer-readable storage medium 500, as indicated in FIG. 5. For example, a replaying module 506 may be configured to receive the relevant execution traces from the reporting module 408 of the computer-readable storage medium 400 discussed above with respect to FIG. 4. The replaying module 506 may also be configured to store the relevant execution traces and replay the relevant execution traces to determine whether the behavior of the application is as expected. Moreover, the computer-readable storage medium 500 may also include any number of additional software components not shown in FIG. 5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for application monitoring, comprising:
   continuously recording execution traces comprising external non-deterministic input data for an application at a user device;
   analyzing the recorded execution traces to identify relevant execution traces for determining a behavior of the application by determining that the application crashed during or after the recording of specific execution traces and, if the application crashed during or after the recording of the specific execution traces, identifying the specific execution traces as relevant execution traces; and
   reporting the relevant execution traces to a server, wherein the server is configured to replay the relevant execution traces to determine whether the behavior of the application is as expected.

2. The method of claim 1, comprising:
continuously recording execution traces relating to external non-deterministic input data for a plurality of applications at a user device;
analyzing the recorded execution traces to identify relevant execution traces for determining a behavior each of the plurality of applications; and
reporting the relevant execution traces to a server, wherein the server is configured to replay the relevant execution traces to determine whether the behavior of each of the plurality of applications is as expected.

3. The method of claim 1, comprising reporting the relevant execution traces to the server, wherein the server is configured to combine the relevant execution traces for the application received from the user device with relevant execution traces for the application received from a plurality of other user devices and replay the combined relevant execution traces to determine whether the application is behaving as expected.

4. The method of claim 1, wherein analyzing the recorded execution traces to identify the relevant execution traces comprises:
comparing the recorded execution traces to execution traces stored on the server; and
identifying only the recorded execution traces that are not already stored on the server as the relevant execution traces.

5. The method of claim 1, wherein recording the execution traces comprises redirecting an application programming interface (API) call comprising the execution traces from an API to a recording module of the user device, and wherein the recording module is configured to log the execution traces relating to the API call and return the API call to the application to enable a normal execution of the API call.

6. The method of claim 1, wherein the server is configured to replay the relevant execution traces by executing an application programming interface (API) call using the relevant execution traces and utilizing a result of the API call to analyze the behavior of the application.

7. A system for application monitoring, comprising:
a user device, comprising:
an application configured to send execution traces comprising external non-deterministic input data to an application programming interface (API);
a recording module configured to:
intercept the execution traces being sent to the API; and
continuously record the execution traces; and
a reporting module configured to:
analyze the recorded execution traces to identify relevant execution traces for determining a behavior of the application by determining that the application crashed during or after the recording of specific execution traces and, if the application crashed during or after the recording of the specific execution traces, identifying the specific execution traces as relevant execution traces; and
report the relevant execution traces to a server; and
the server, comprising a replaying module configured to replay the relevant execution traces to determine whether the behavior of the application is as expected.

8. The system of claim 7, wherein the recording module of the user device is configured to:
intercept execution traces comprising external non-deterministic input data being sent to any of a plurality of APIs from a plurality of applications; and
continuously record the execution traces;
the reporting module of the user device is configured to:
analyze the recorded execution traces to identify relevant execution traces for determining a behavior each of the plurality of applications; and
report the relevant execution traces to the server; and
the replaying module of the server is configured to replay the relevant execution traces to determine whether the behavior of each of the plurality of applications is as expected.

9. The system of claim 7, wherein the execution traces comprise a sequence of API calls and external non-deterministic input data related to the API calls.

10. The system of claim 7, wherein the replaying module of the server is configured to combine the relevant execution traces for the application received from the user device with relevant execution traces for the application received from a plurality of other user devices and replay the combined relevant execution traces to determine whether the behavior of the application is as expected.

11. The system of claim 7, wherein the reporting module of the user device is configured to analyze the recorded execution traces to identify the relevant execution traces by comparing the recorded execution traces to execution traces that are already stored on the server and identifying only the recorded execution traces that are not already stored on the server as the relevant execution traces.

12. The system of claim 7, wherein the replaying module of the server is configured to determine modifications to the application if it is determined that the behavior of the application is not as expected.

13. The system of claim 7, wherein the external non-deterministic input data comprises file data.

14. The system of claim 7, wherein the external non-deterministic input data comprise network data.

15. The system of claim 7, wherein the external non-deterministic input data comprise system information corresponding to the user device.

16. The system of claim 7, wherein the external non-deterministic input data comprise graphical user interface (GUI) data.

17. The system of claim 7, wherein the external non-deterministic input data comprise registry data.

18. A computer-readable storage medium for storing computer-readable instructions, the computer-readable instructions providing an application monitoring system when executed by a processing device, the computer-readable instructions comprising code configured to:
continuously record execution traces comprising external non-deterministic input data for an application;
analyze the recorded execution traces to identify relevant execution traces for analyzing a manner in which the application is behaving by determining that the application crashed during or after the recording of specific execution traces and, if the application crashed during or after the recording of the specific execution traces, identify the specific execution traces as relevant execution traces; and
report the relevant execution traces to a server, wherein the server is configured to replay the relevant execution traces to determine whether the application is behaving in an authorized manner.

* * * * *